(12) United States Patent
Belik et al.

(10) Patent No.: US 11,230,374 B2
(45) Date of Patent: Jan. 25, 2022

(54) UAV HAVING HERMETICALLY SEALED MODULARIZED COMPARTMENTS AND FLUID DRAIN PORTS

(71) Applicant: AEROVIRONMENT, INC., Simi Valley, CA (US)

(72) Inventors: Pavel Belik, Simi Valley, CA (US); Thomas Szarek, Oak Park, CA (US); Gabriel E. Torres, Simi Valley, CA (US); Vernon P. Fraye, Simi Valley, CA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

(21) Appl. No.: 16/842,710

(22) Filed: Apr. 7, 2020

(65) Prior Publication Data
US 2021/0009265 A1 Jan. 14, 2021

Related U.S. Application Data

(63) Continuation of application No. 15/164,552, filed on May 25, 2016, now Pat. No. 10,647,423, which is a (Continued)

(51) Int. Cl.
| | |
|---|---|
| *B60F 5/00* | (2006.01) |
| *B64C 35/00* | (2006.01) |
| *B64C 39/02* | (2006.01) |
| *B64C 25/52* | (2006.01) |
| *B64D 9/00* | (2006.01) |

(52) U.S. Cl.
CPC .............. *B64C 35/008* (2013.01); *B60F 5/00* (2013.01); *B64C 25/52* (2013.01); *B64C 39/024* (2013.01); *B64D 9/00* (2013.01); *B64C 2201/042* (2013.01)

(58) Field of Classification Search
CPC ....... B60F 5/00; B64C 35/008; B64C 35/024; B64C 25/52
See application file for complete search history.

(56) References Cited

U.S. PATENT DOCUMENTS

| | | | |
|---|---|---|---|
| 1,746,669 A * | 2/1930 | Loudy | B64C 35/00 244/129.1 |
| 1,769,406 A | 7/1930 | Worthington | |

(Continued)

FOREIGN PATENT DOCUMENTS

| | | |
|---|---|---|
| CN | 2179334 Y | 10/1994 |
| CN | 1155329 A | 7/1997 |

(Continued)

OTHER PUBLICATIONS

Canadian Intellectual Property Office (CIPO); Examination Report (Exam_Rpt) and Examination Search Report (Exam_Search_Rpt) for corresponding Canadian case application No. 2,840,554, entitled UAV having hermetically sealed modularized compartments and fluid drain ports by Belik et al., dated Jul. 2, 2020, 3 pgs.

(Continued)

*Primary Examiner* — Justin M Benedik
(74) *Attorney, Agent, or Firm* — Christopher R. Balzan, Esq.; Eric J. Aagaard, Esq.

(57) ABSTRACT

In one possible embodiment, an amphibious unmanned aerial vehicle is provided, which includes a fuselage comprised of a buoyant material. Separators within the fuselage form separate compartments within the fuselage. Mounts associated with the compartments for securing waterproof aircraft components within the fuselage. The compartments each have drainage openings in the fuselage extending from the interior of the fuselage to the exterior of the fuselage.

20 Claims, 3 Drawing Sheets

Related U.S. Application Data continuation of application No. 13/730,825, filed on Dec. 28, 2012, now Pat. No. 9,365,088, which is a continuation of application No. PCT/US2011/042285, filed on Jun. 29, 2011.

(60) Provisional application No. 61/359,809, filed on Jun. 29, 2010.

(56) References Cited

U.S. PATENT DOCUMENTS

| | | | |
|---|---|---|---|
| 2,309,875 A * | 2/1943 | Thompson | B60F 3/0007 440/100 |
| 2,415,615 A | 2/1947 | Wallace | |
| 2,444,332 A | 6/1948 | Briggs et al. | |
| 3,092,060 A * | 6/1963 | Reid | B64C 37/00 114/313 |
| 5,031,565 A * | 7/1991 | Alino | B60F 3/003 114/332 |
| 5,250,845 A | 10/1993 | Runyan | |
| 5,277,380 A | 1/1994 | Cycon et al. | |
| 5,575,438 A | 11/1996 | McGonigle et al. | |
| 5,666,900 A | 9/1997 | Carroll, III et al. | |
| 5,779,190 A * | 7/1998 | Rambo | B64C 39/024 244/118.2 |
| 6,056,237 A * | 5/2000 | Woodland | F42B 15/22 244/3.15 |
| 6,409,122 B1 | 6/2002 | Nicolai | |
| 6,761,334 B1 | 7/2004 | Nutu et al. | |
| 6,926,235 B2 | 8/2005 | Ouellette et al. | |
| 7,097,136 B2 | 8/2006 | Ruszkowski, Jr. | |
| 7,237,750 B2 | 7/2007 | Chiu et al. | |
| 7,322,872 B2 | 1/2008 | Butler et al. | |
| 7,325,772 B1 | 2/2008 | Hanewinkel, III et al. | |
| 7,690,300 B2 | 4/2010 | Olive et al. | |
| 7,997,529 B2 | 8/2011 | Koch et al. | |
| 9,365,088 B2 | 6/2016 | Belik et al. | |
| 10,647,423 B2 | 5/2020 | Belik et al. | |
| 2002/0092949 A1* | 7/2002 | Nicolai | B64C 35/005 244/106 |
| 2003/0066932 A1 | 4/2003 | Carroll | |
| 2006/0102798 A1 | 5/2006 | Cox et al. | |
| 2006/0145000 A1 | 7/2006 | Hensley | |
| 2007/0018041 A1 | 1/2007 | Butler et al. | |
| 2007/0181745 A1* | 8/2007 | Huber | B64C 1/068 244/118.1 |
| 2010/0065691 A1 | 3/2010 | Droney | |
| 2010/0074758 A1 | 3/2010 | Rawdon et al. | |
| 2011/0226174 A1 | 9/2011 | Parks | |

FOREIGN PATENT DOCUMENTS

| | | |
|---|---|---|
| CN | 2506541 Y | 8/2002 |
| CN | 1370715 A | 9/2002 |
| CN | 101060896 A | 10/2007 |
| CN | 200985093 Y | 12/2007 |
| CN | 101331058 A | 12/2008 |
| CN | 101687540 A | 3/2010 |
| CN | 101713221 A | 5/2010 |
| DE | 19957207 A1 | 5/2001 |
| GB | 565692 A | 11/1944 |
| WO | 2007008719 A3 | 1/2007 |
| WO | 2011002331 A1 | 1/2011 |

OTHER PUBLICATIONS

Korean Intellectual Property Office (KIPO); Office Action (OA) for corresponding Korean case application No. 10-2020-7029056, entitled UAV having hermetically sealed modularized compartments and fluid drain ports by Belik et al., dated Nov. 9, 2020, 2 pgs.

Chinese State Intellectual Property Office (CSIPO); First Office Action (1OA) for corresponding Chinese case application No. 201810059275.0, entitled UAV having hermetically sealed modularized compartments and fluid drain ports by Belik et al., dated Nov. 4, 2020, 11 pgs.

Canadian Intellectual Property Office (CIPO); Examination Report (Exam_Rpt) and Examination Search Report (Exam_Search_Rpt) for corresponding Canadian case application No. 2,840,554, entitled UAV having hermetically sealed modularized compartments and fluid drain ports by Belik et al., dated Jan. 29, 2021, 4 pgs.

Intellectual Property Office of Singapore (IPOS); Singapore Written Opinion (SG_WO) for corresponding Singapore case application No. 201302136-5, entitled UAV having hermetically sealed modularized compartments and fluid drain ports by Belik et al,. dated Apr. 11, 2014 from Danish Patent and Trademark Office, 10 pgs.

Intellectual Property Office of Singapore (IPOS); Search Report (SG_Search_Rpt) for corresponding Singapore case application No. 201302136-5, entitled UAV having hermetically sealed modularized compartments and fluid drain ports by Belik et al,. dated Apr. 11, 2014 from Danish Patent and Trademark Office, 7 pgs.

The State Intellectual Property Office of the People's Republic of China (SIPO); First Office Action (1OA) and Search Report (SR) for corresponding Chinese case application No. 2011180035411.9, entitled UAV having hermetically sealed modularized compartments and fluid drain ports by Belik et al., dated Oct. 30, 2014 from the State Intellectual Property Office of the People's Republic of China, 8 pgs.

Australian Government, IP Australia (AUIP); Examiner's Report (Exam_Rpt) for corresponding Australian case application No. 2011305991, entitled UAV having hermetically sealed modularized compartments and fluid drain ports by Belik et al., dated Jan. 8, 2015 from The Australian Government, IP Australia, 3 pgs.

Intellectual Property Office of Singapore (IPOS); Examination Report (Exam_Rpt) for corresponding Singapore case application No. 201302136-5, entitled UAV having hermetically sealed modularized compartments and fluid drain ports by Belik et al,. dated Jan. 30, 2015 from Intellectual Property Office of Singapore, 14 pgs.

Taiwan Intellectual Property Office (TIPO); Search Report (Search_Rpt) for corresponding Taiwan case application No. 100122917, entitled UAV having hermetically sealed modularized compartments and fluid drain ports by Belik et al,. Date of Research: Sep. 10, 2015 from Taiwan Intellectual Property Office, 2 pgs.

International Searching Authority; International Search Report (ISR) for corresponding PCT case application No. PCT/2011/042285, entitled UAV having hermetically sealed modularized compartments and fluid drain ports by Belik et al., dated Feb. 28, 2012 from US International Searching Authority, 2 pgs.

International Searching Authority; Written Opinion of the International Searching Authority (WO) and Search History for corresponding PCT/US2011/042285 entitled UAV Having Hermetically Sealed Modularized Compartments and Fluid Drain Ports by Belik et al.; dated Feb. 28, 2012 from US International Searching Authority; 9 pgs.

The State Intellectual Property Office of the People's Republic of China (SIPO); Second Office Action (OA2) for corresponding Chinese case application No. 2011180035411.9, entitled UAV having hermetically sealed modularized compartments and fluid drain ports by Belik et al., dated Sep. 15, 2015 from The State Intellectual Property Office of the People's Republic of China, 3 pgs.

Taiwan Intellectual Property Office (TIPO); English translation of Office Action (OA) for corresponding Taiwan case application No. 100122917 entitled UAV having hermetically sealed modularized compartments and fluid drain ports by Belik et al., dated Sep. 14, 2015 from Taiwan Intellectual Property Office, 4 pgs.

The State Intellectual Property Office of the People's Republic of China (SIPO); Third Office Action (OA3) for corresponding Chinese case application No. 2011180035411.9, entitled UAV having hermetically sealed modularized compartments and fluid drain ports by Belik et al., dated May 30, 2016 from The State Intellectual Property Office of the People's Republic of China, 3 pgs.

The State Intellectual Property Office of the People's Republic of China (SIPO); Fourth Office Action (OA4) for corresponding Chinese case application No. 2011180035411.9, entitled UAV having hermetically sealed modularized compartments and fluid drain ports

(56) References Cited

OTHER PUBLICATIONS by Belik et al., dated Feb. 6, 2017 from The State Intellectual Property Office of the People's Republic of China, 3 pgs.

Canadian Intellectual Property Office (CIPO); First Office Action (OA1) and Search Report (Search Rpt) for corresponding Canadian case application No. 2,840,554, entitled UAV having hermetically sealed modularized compartments and fluid drain ports by Belik et al., dated Mar. 30, 2017 from Canadian Intellectual Property Office, 3 pgs.

Korean Intellectual Property Office (KIPO); First Office Action (1OA) for corresponding Korean case application No. 10-2013-7002310 entitled UAV having hermetically sealed modularized compartments and fluid drain ports by Belik et al., dated Aug. 21, 2017 Korean Intellectual Property Office, 2 pgs.

European Patent Office (EPO); extended European Search Report (eESR) for corresponding EPC patent application No. 11827126.1-1754 entitled UAV having hermetically sealed modularized compartments and fluid drain ports by Belik et al., dated Nov. 7, 2017 European Patent Office, 7 pgs.

Australian Government, IP Australia (AUIP); Examiner's Report (Exam_Rpt) for corresponding Australian case application No. 2011305991 entitled UAV having hermetically sealed modularized compartments and fluid drain ports by Belik et al., dated Dec. 1, 2017 from The Australian Government, IP Australia, 3 pgs.

Canadian Intellectual Property Office (CIPO); Second Office Action (OA2) and Search Report (Search_Rpt) for corresponding Canadian case application No. 2,840,554, entitled UAV having hermetically sealed modularized compartments and fluid drain ports by Belik et al., dated Jan. 22, 2018 from Canadian Intellectual Property Office, 3 pgs.

Korean Intellectual Property Office (KIPO); Office Action (OA) for corresponding Korean case application No. 10-2013-7002310, entitled UAV having hermetically sealed modularized compartments and fluid drain ports by Belik et al., dated Mar. 29, 2018 from Korean Intellectual Property Office, 4 pgs.

Intellectual Property India (IPI); First Examination Report (FER) in English for corresponding Indian patent application No. 217/KOLPN/2013, entitled UAV having hermetically sealed modularized compartments and fluid drain ports by Belik et al., dated Jul. 31, 2018 from Intellectual Property India, 7 pgs.

European Patent Office (EPO); Office Action (OA) for corresponding EPC patent application No. 11827126.1, entitled UAV having hermetically sealed modularized compartments and fluid drain ports by Belik et al., dated Nov. 18, 2018 from European Patent Office, 5 pgs.

Korean Intellectual Property Office (KIPO); Final Office Action (FOA) for corresponding Korean case application No. 10-2013-7002310, entitled UAV having hermetically sealed modularized compartments and fluid drain ports by Belik et al., dated Mar. 5, 2019 from Korean Intellectual Property Office, 4 pgs.

Korean Intellectual Property Office (KIPO); Office Action (OA) for corresponding Korean case application No. 10-2019-7027346, entitled UAV having hermetically sealed modularized compartments and fluid drain ports by Belik et al., dated Nov. 27, 2019 from Korean Intellectual Property Office, 2 pgs.

European Patent Office (EPO); Intention to Grant (Intention_Grant) for corresponding EPC patent application No. 11 827 126.1-1010, entitled UAV having hermetically sealed modularized compartments and fluid drain ports by Belik et al., dated Oct. 7, 2019; 40 pgs.

Australia Patent Office (APO); Examination Report (Exam_Rpt) for corresponding Australian case application No. 2019201561, entitled UAV having hermetically sealed modularized compartments and fluid drain ports by Belik et al., dated Mar. 4, 2020 from Australian Patent Office, 3 pgs.

European Patent Office (EPO); Extended European Search Report (eESR) for corresponding EPC patent application No. 20158404.2-1010, entitled UAV having hermetically sealed modularized compartments and fluid drain ports by Belik et al., dated Jul. 9, 2020; 9 pgs.

Euopean Patent Office (EPO); Article 94(3) EPC Communication for corresponding EPC patent application No. 20158404.2-1010, entitled UAV having hermetically sealed modularized compartments and fluid drain ports by Belik et al., dated May 19, 2020; 5 pgs.

Indian Patent Office (IPO); First Examination Report (FER) for corresponding Indian case application No. 201938017398, entitled An Amphibious Unmanned Aerial Vehicle, by Belik et al., dated Aug. 12, 2021; 7 pgs.

The National Intellectual Property Administration of the People's Republic of China (CNIPA), English translation of Second Office Action (OA2) for corresponding Chinese case application No. 201810059275.0, entitled UAV having hermetically sealed modularized compartments and fluid drain ports by Belik et al., dated Sep. 7, 2021; 13 pgs.

\* cited by examiner

UAV HAVING HERMETICALLY SEALED MODULARIZED COMPARTMENTS AND FLUID DRAIN PORTS

CROSS REFERENCE TO RELATED APPLICATIONS

The present application is a continuation of U.S. patent application Ser. No. 15/164,552, filed May 25, 2016, by Belik et al., entitled UAV HAVING HERMETICALLY SEALED MODULARIZED COMPARTMENTS AND FLUID DRAIN PORTS, which is a continuation of U.S. patent application Ser. No. 13/730,825, filed Dec. 28, 2012, by Belik et al., entitled UAV HAVING HERMETICALLY SEALED MODULARIZED COMPARTMENTS AND FLUID DRAIN PORTS, which is a continuation of PCT Application number PCT/US2011/042285, by Belik et al., entitled UAV HAVING HERMETICALLY SEALED MODULARIZED COMPARTMENTS AND FLUID DRAIN PORTS, filed 29 Jun. 2011, which are herein incorporated by reference in their entireties, which claims priority of U.S. Provisional Application No. 61/359,809, by Belik et al., filed on Jun. 29, 2010, herein incorporated by reference in its entirety.

BACKGROUND

Reducing weight and size are paramount in the design of small unmanned vehicles. Small unmanned aerial vehicles or UAVs typically are designed to be launched from, and land on dry land. Such vehicles are now being sought that can operate while being exposed to, or after being exposed to aquatic environments. For example, it may be preferred to land an unmanned aerial vehicle on water, rather than on land, either to lessen the impact of landing, or because it is more easily retrievable location. Typically, amphibious aircraft, both manned and unmanned, are able to take off and land in water.

Hand launched amphibious UAVs though are not required to take off from the water, but are required to land on dry land, or on water. Some hand launced UAVs are designed to land by skidding along, or impacting the ground, which is considerably more abrupt than water landings.

What is needed is an amphibious UAV that can withstand high impact ground landings.

SUMMARY

In one possible embodiment, an amphibious unmanned aerial vehicle is provided, which includes a fuselage comprised of a buoyant material. Separators within the fuselage form separate compartments within the fuselage. Mounts associated with the compartments for securing waterproof aircraft components within the fuselage. The compartments each have drainage openings in the fuselage extending from the interior of the fuselage to the exterior of the fuselage.

In one possible embodiment, an amphibious unmanned aerial vehicle is provided, which includes a fuselage constructed of a buoyant material and separators within the fuselage forming separate battery, payload, and avionics compartments within the fuselage. Mounts associated with the compartments are provided for securing a battery, a payload, and avionics within the fuselage. Drainage openings extend through the wall of fuselage to connect the compartments with the exterior of the unmanned aerial vehicle.

In one possible embodiment, an amphibious unmanned aerial vehicle is provided including a fuselage constructed of a buoyant material with separators in the fuselage forming separate battery, payload, and avionics compartments within the fuselage. The battery compartment and the avionics compartment have a drainage channels having a weep holes through the fuselage. The payload compartment has an open bottom. Mounting surfaces within the battery, payload, and avionics compartments are provided for mounting a battery module, a payload module, and an avionics module within the fuselage.

BRIEF DESCRIPTION OF THE DRAWINGS

The features and advantages of the present invention will be better understood with regard to the following description, appended claims, and accompanying drawings where:

DESCRIPTION

Figure 1:
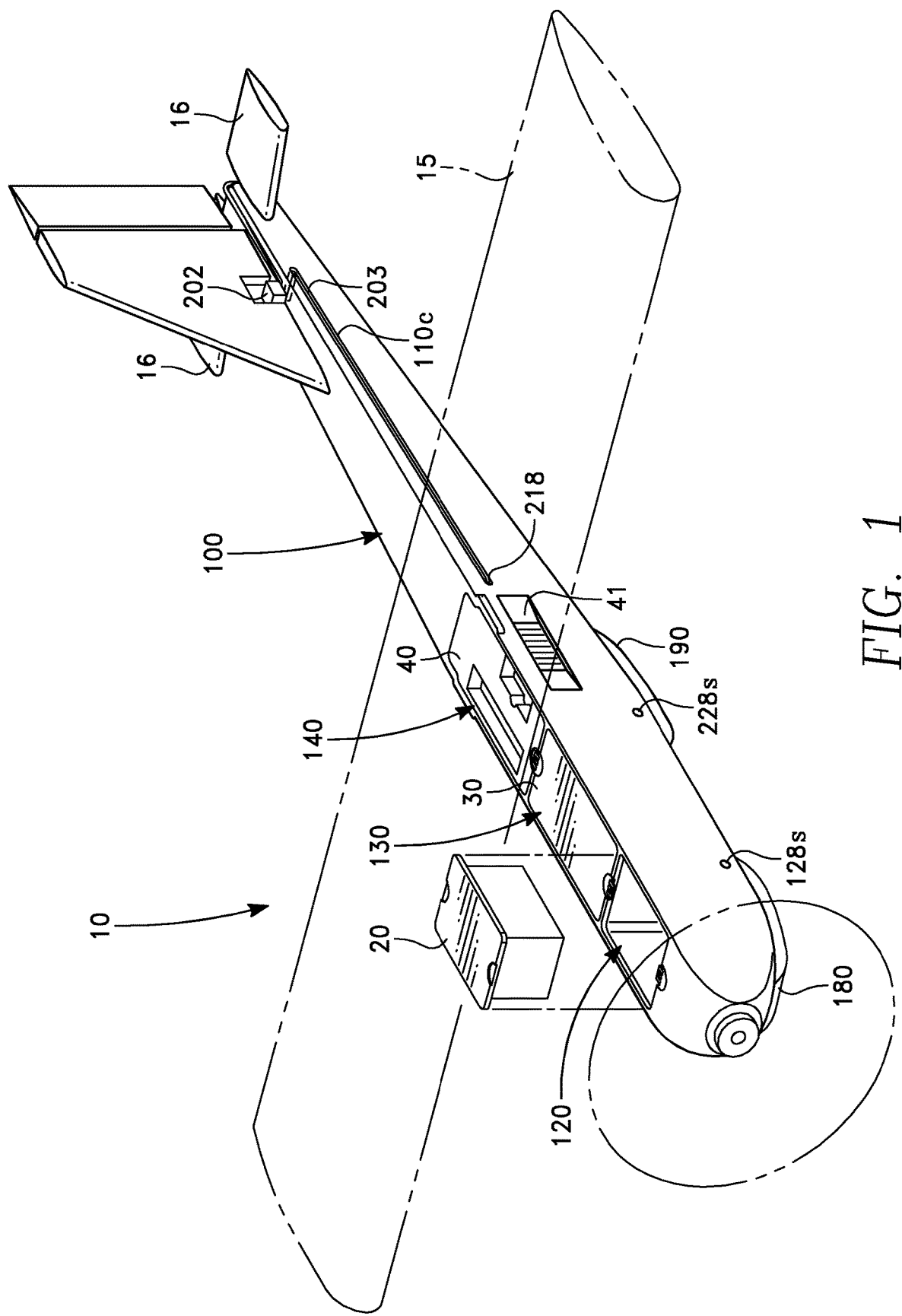
FIG. 1 shows a simplified perspective view of an amphibious unmanned aerial vehicle.

FIG. 1 shows a simplified perspective view of an amphibious unmanned aerial vehicle or UAV 10. The UAV 10 has a fuselage 100 of the amphibious unmanned aerial vehicle 10 has modularized compartments 120, 130, and 140 to contain modular components or modules, such as a battery module 20, a payload module 30, and avionics electronics module 40. In various embodiments, the wings 15 and/or 16 may be constructed of multiple pieces, which may separate, and/or "break away" or separate from the fuselage 100 during landings.

Figure 2:
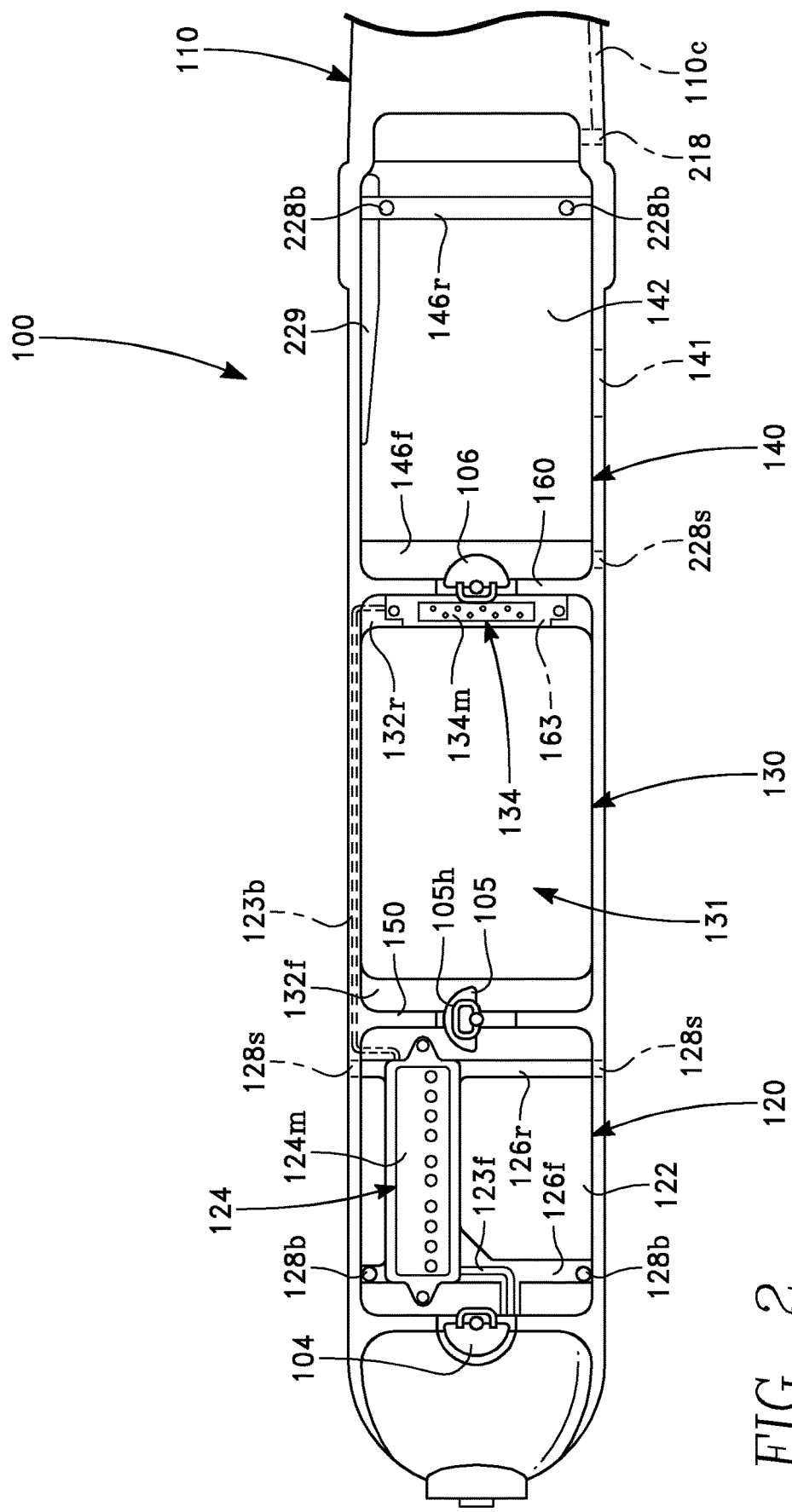
FIG. 2 shows a simplified top view of the fuselage of the amphibious unmanned aerial vehicle of FIG. 1.

FIG. 2 shows a simplified top view of the fuselage 100 of the amphibious unmanned aerial vehicle 10 of FIG. 1. The walls 110 of the fuselage 100 are composed of a buoyant material so that the fuselage 100 will float without wings (not shown) attached when the fuselage is fully loaded with components, such as the battery 20, the payload 30, and the avionics electronics 40, shown in FIG. 1, and other aircraft parts and components. For example, the walls 110 may have a molded foam core sealed with a waterproof skin, though this is not required. The walls 110 may be a single continuous wall or multiple wall sections, or the like.

In this embodiment, the fuselage is separated into three compartments, a forward battery compartment 120, a central payload compartment 130, and a rear avionics compartment 140. The forward battery compartment 120 is separated from the central payload compartment 130 by separator wall 150. The central payload compartment 130 is separated from the rear avionics compartment 140 by separator wall 160. In the embodiment shown, tabs 104, 105, and 106 are employed as a means to secure the components (not shown) in the compartments 120, 130, and 140. The tab 105 may be rotated by hand using the pivotable handle 105h to allow installation of a battery (not shown) and then rotated back to the position shown to lock the battery in the forward battery compartment 120. Other securing mechanisms may be used instead or in addition to the rotatable tabs 104, 105, and 106.

The battery compartment 120 has mounting surfaces 122 which support a battery (not show). In this embodiment, a connector 124, which may be a surface mount connector or the like, is generally flush with the mounting surfaces 122. Channels 126f and 126r are recessed below the mounting surfaces 122. Drainage openings such as weep holes 128b in the channel 126f extend through the bottom wall 110b of the fuselage 100. Weep holes 128s (shown in FIGS. 1-3) in the channel 126r extend through the side wall 110s of the fuselage 100.

The mating surface 124m of the connector 124 is located above the channels 126f and 126r so that the mating surface is not submerged in water when the battery 20 (FIG. 1) is connected/disconnected, if the fuselage is out of the water. Wiring 123f and 123b may be routed in the channels 126f and 126b, respectively, and recessed and/or embedded through the fuselage 100 to provide power to the motor (not show) and avionics electronics module 40 and/or a payload module 30.

The central payload compartment 130 has front and rear mounting surfaces 132f and 132r which support a payload, such as a camera assembly (not shown). The payload module 30 may contain the imaging, sensing, or other passive, active, non-lethal, or lethal payload devices. In this embodiment, a connector 134, which may be a surface mount connector or the like, is generally flush with the mounting surface 132r. The mounting surface 132r may form an enclosure 163 to contain the connector 134 and associated wiring. The enclosure may form a lower part of the separator wall 160. Weep holes 228s (shown in FIGS. 1-3) may extend from inside the enclosure 163 through the side wall 110s to allow water to exit the enclosure 163. In this embodiment, the central compartment 130 has a large opening 131 in the bottom so that a camera can be utilized, such as by viewing downward or by lowering it into the airstream through the large opening 131. The large opening 131 also allows drainage of fluid from the central compartment 130.

In various embodiments, the mating surface 134m of the connector 134 may be located high above the opening 131, on the top of the enclosure 163, so that the mating surface is not submerged in water when the payload 30 (FIG. 1) is connected/disconnected, even if the fuselage is not completely out of the water.

The rear avionics compartment 140 has a mounting surface 142 in a bottom of the avionics compartment 140. The mounting surface 142 has a forward channel 146f and a rear channel 146r. Channels 146f and 146r are recessed below the mounting surface 142. Drainage openings such as weep hole 228s (shown in FIGS. 1-3) in channel 146f extends through the side wall 110s of the fuselage 100. Weep holes 228b (shown in FIGS. 2 and 3) in the channel 146r extend through the bottom wall 110b of the fuselage 100. A sloping recess 229 in the mounting surface 142 drains water off the mounting surface 142 and into the channel 146r.

Figure 3:
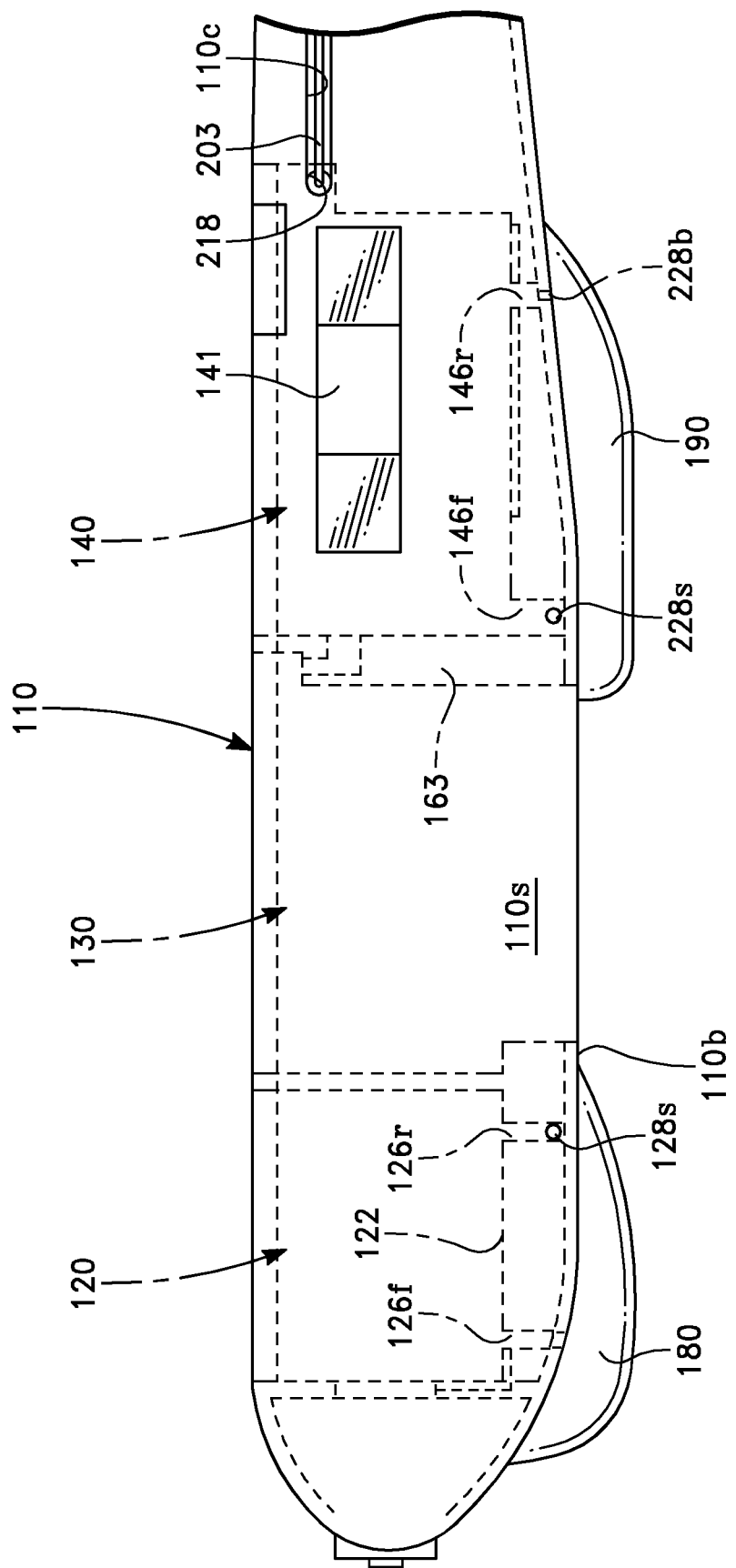
FIG. 3 shows a simplified side view of the fuselage of an amphibious unmanned aerial vehicle of FIG. 1.

The embodiment shown in FIG. 3 has an opening 141 in the side wall 110s of fuselage 100, to expose a heat sink 41 (FIG. 1) and allow heat generated by the avionics electronics 40 (FIG. 1) to be released.

FIG. 3 shows a simplified side view of the fuselage 100 of an amphibious unmanned aerial vehicle 10 of FIG. 1. In this embodiment, optional skid pads 180 and 190 are secured to the bottom wall 110b of the fuselage 100. The skid pads 180 and 190 are used in this embodiment for landing on hard surfaces. The skid pad 180 may be located directly below the forward compartment 120 and may be fabricated of a durable shock absorbing material of sufficient thickness and density to further protect from impact the component within the compartment 120, such as the battery 20 (FIG. 1). Similarly, the skid pad 190 may be located directly below the rear compartment 140, and may be fabricated of a durable shock absorbing material of sufficient thickness and density to further protect from impact a component within the compartment 140, such as the avionics electronics 40 (FIG. 1).

Weep holes 128s extend through the side wall 110s of the fuselage 100. The weep hole 128s extends through the side wall 110s and into rear channel 126r of the battery compartment 120. The weep hole 228s extends through the side wall 110s and into the enclosure 163 of the central payload compartment 130.

The fluid drainage openings may be weep holes, fluid drainage ports, or the like.

Various embodiments provide a fuselage 100 for a UAV which can land both on water and rugged terrain. Instead of sealing the entire aircraft from water intrusion, various embodiments achieve the ability to land on water by having just the individual electrical and electronic components, i.e. battery, payload, avionics electronics, and associated connectors and wiring, hermetically sealed.

This allows the rest of the aircraft to remain buoyant and any water in the aircraft draining by a set of fluid drain ports when the UAV is retrieved from the water. In this manner, the protection of the electrical and electronic components is not dependant on maintaining the integrity of the fuselage 100 or the exterior walls 110, which is likely to be damaged during landings on hard and/or rugged surfaces (typical of land landings).

This also allows the volume within the aircraft that needs to be waterproof to be minimized, thus reducing weight and overall system complexity.

Further, the aircraft's ability to land on hard surfaces or rugged terrain without damage to the electrical and electronic components is achieved not just by having these components encased in modularized compartments 120, 130, and 140, but also by allowing the walls 110 of the compartments 120, 130, and 140 to be partially compromised without necessarily causing failure of the UAV. The walls 110 create an impact zone around the electrical and electronic components within the compartments 120, 130, and 140, and the separators inhibit the components 20, 30, and 40 from impacting each other. Optionally, in some embodiments, the walls 110 and mounts 122, 132f, 132r, and 142 are such that the components 20, 30, and 40 (FIG. 1) are recessed from the walls 110 and/or their respective separators 150 and 160 (FIG. 2). Additional shock absorbing material (not shown) may be added within the compartments 120, 130, or 140 to further reduce any chance of damage to the components 20, 30, or 40 from impacts.

As illustrated in FIGS. 1 and 2, the fuselage 100 may contain an optional exterior channel 110c in the side 110s of the fuselage 100, extending rearward from a hole 218 in the side wall 110s at the avionics compartment 140, to the tail section of the aircraft 10. Wiring 203 extends through the hole 218 and along the exterior channel 110c to connect the avionics component 40 to an actuator assembly 202 for actuating the control surfaces in the tail of the aircraft 10. The exterior channel 110c allows the wiring to be easily accessed for inspection, repair, and replacement.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. An amphibious unmanned aerial vehicle comprising:
   a) a fuselage comprised of a buoyant material walls;
   b) separators within the fuselage forming separate compartments within the fuselage;
   c) mounts associated with the compartments for securing waterproof aircraft components within the fuselage; and
   d) wherein the compartments are constructed to individually surround a battery, a payload, and avionics electronics, but wherein the compartments are not sealed from water intrusion, while the battery, the payload, the avionics electronics, and associated connectors and wiring are hermetically sealed such that the amphibious unmanned aerial vehicle is capable of landing on land and on water without damage to electrical and electronic components.

2. The amphibious unmanned aerial vehicle of claim 1, wherein the compartments are modularized compartments comprising openings to allow loading of a battery module, a payload module, and an avionics electronics module therein.

3. The amphibious unmanned aerial vehicle of claim 2 comprising a securing mechanism to retain the battery module, the payload module, and the avionics electronics module within their respective modularized compartments.

4. The amphibious unmanned aerial vehicle of claim 3, wherein the securing mechanism comprises hand rotatable tabs.

5. The amphibious unmanned aerial vehicle of claim 4, wherein the hand rotatable tabs comprise a pivotable handle.

6. The amphibious unmanned aerial vehicle of claim 1, wherein the compartments each have drainage openings in the fuselage extending from the interior of the fuselage to the exterior of the fuselage.

7. The amphibious unmanned aerial vehicle of claim 6, wherein the drainage openings in some of the compartments comprise weep holes through a wall of the fuselage.

8. The amphibious unmanned aerial vehicle of claim 1, wherein at least one of the compartments comprises a drainage channel at a bottom thereof, and wherein the drainage channel comprises a drainage opening associated therewith.

9. The amphibious unmanned aerial vehicle of claim 8, wherein the drainage opening comprises a weep hole.

10. The amphibious unmanned aerial vehicle of claim 8, wherein the drainage opening comprises a plurality of weep holes.

11. The amphibious unmanned aerial vehicle of claim 1, comprising a skid pad on a bottom of the fuselage.

12. The amphibious unmanned aerial vehicle of claim 1 comprising drainage openings extending through the separators within the fuselage.

13. The amphibious unmanned aerial vehicle of claim 1 comprising securing mechanisms at a top of the fuselage adjacent to openings in the compartments to secure the waterproof aircraft components within the compartments.

14. The amphibious unmanned aerial vehicle of claim 1, wherein at least some of the mounts within the compartments comprise integrated connectors for electrically connecting a corresponding aircraft component upon mounting of the corresponding aircraft component within a respective compartment.

15. The amphibious unmanned aerial vehicle of claim 1, wherein the compartments comprise a battery compartment comprising a surface mount connector flush with a mounting surface of the mounts within the battery compartment.

16. The amphibious unmanned aerial vehicle of claim 1, wherein the compartments comprise a payload compartment comprising a surface mount connector flush with a mounting surface of the mounts within the payload compartment.

17. The amphibious unmanned aerial vehicle of claim 1, wherein the compartments comprise a payload compartment comprising an open bottom.

18. The amphibious unmanned aerial vehicle of claim 17, wherein there is no fuselage wall below the payload compartment.

19. The amphibious unmanned aerial vehicle of claim 1, wherein the compartments comprise an avionics compartment comprising a heat sink opening.

20. The amphibious unmanned aerial vehicle of claim 1 comprising:
   a) the separators within the fuselage forming separate battery, payload, and avionics compartments within the fuselage to protect the battery, the payload, and the avionics electronics;

b) the mounts associated with the compartments being for securing the battery, the payload, and the avionics electronics within the fuselage; and
c) drainage openings extending through the wall of fuselage to connect the compartments with an exterior of the unmanned aerial vehicle.

\* \* \* \* \*